United States Patent
Yoshimura et al.

(10) Patent No.: US 7,285,616 B2
(45) Date of Patent: Oct. 23, 2007

(54) AROMATIC POLYMER, METHOD FOR PRODUCING THE SAME AND USES THEREOF

(75) Inventors: Ken Yoshimura, Tsukuba (JP); Arihiro Yashiro, Ibaraki (JP); Mitsunori Nodono, Tsukuba (JP)

(73) Assignee: Sumitomo Chemical Company, Limited, Osaka (JP)

(*) Notice: Subject to any disclaimer, the term of this patent is extended or adjusted under 35 U.S.C. 154(b) by 467 days.

(21) Appl. No.: 10/395,299

(22) Filed: Mar. 25, 2003

(65) Prior Publication Data

US 2003/0180596 A1 Sep. 25, 2003

(30) Foreign Application Priority Data

Mar. 25, 2002 (JP) ............................. 2002-082967
Jul. 4, 2002 (JP) ............................. 2002-195594

(51) Int. Cl.
*C08G 59/42* (2006.01)
*C08F 8/00* (2006.01)
*C08J 5/22* (2006.01)
*H01M 8/10* (2006.01)

(52) U.S. Cl. .................. 528/156; 528/86; 528/162; 429/33; 521/27

(58) Field of Classification Search .............. 528/86, 528/66, 156, 112; 429/33; 521/27
See application file for complete search history.

(56) References Cited

U.S. PATENT DOCUMENTS 4,024,043 A 5/1977 Dege et al.

4,366,262 A 12/1982 Covitch

FOREIGN PATENT DOCUMENTS

| DE | 33 46 935 A1 | 7/1985 |
|---|---|---|
| EP | 1 113 517 A2 | 7/2001 |
| EP | 1 117 310 A2 | 1/2002 |
| JP | 10-21943 A | 1/1998 |
| JP | 10-45913 A | 2/1998 |
| JP | 11-502249 A | 2/1999 |
| JP | 11-116679 A | 4/1999 |
| JP | 2001-302721 A | 10/2001 |
| JP | 2003-272695 A | 9/2003 |
| WO | WO86/00624 A1 | 1/1986 |
| WO | WO96/13872 A1 | 5/1996 |
| WO | WO97/26284 A1 | 7/1997 |
| WO | WO99/46305 A1 | 9/1999 |
| WO | WO 00/15691 A1 | 3/2000 |
| WO | WO 01/42336 A1 | 6/2001 |
| WO | WO 01/94427 A1 | 12/2001 |

OTHER PUBLICATIONS

Abstract No. 50309n, Chemical Abstracts, vol. 117, No. 6, Aug. 10, 1992.
AN 2002-174435, Database WPI, Section Ch, Week 200223, XP-002246811.

*Primary Examiner*—Duc Truong
(74) *Attorney, Agent, or Firm*—Sughrue Mion Pllc.

(57) ABSTRACT

There is provided a polymer electrolyte which shows excellent characteristics as proton conductive membrane of fuel cells and the like. This polymer electrolyte contains an aromatic polymer which is characterized by having a super strong acid group in a side chain.

19 Claims, 1 Drawing Sheet

FIG. 1

AROMATIC POLYMER, METHOD FOR PRODUCING THE SAME AND USES THEREOF

BACKGROUND OF THE INVENTION

1. Field of the Invention

The present invention relates to an aromatic polymer, and particularly to an aromatic polymer comprising a super strong acid group in side chains.

2. Description of Related Art

As membranes of electrochemical devices such as primary batteries, secondary batteries and solid polymer type fuel cells, there are used polymers having proton conductivity, namely, polymer electrolytes. For example, aliphatic polymers in which the side chain has a perfluoroalkylsulfonic acid as a super strong acid and the main chain is a perfluoroalkyl have been mainly used since they are superior in characteristics as fuel cells. However, these materials suffer from the problems that they are very expensive, low in heat resistance and low in membrane strength and cannot be practically used without making some reinforcement.

Under the circumstances, development of inexpensive polymer electrolytes substitutable for the above polymer electrolytes has recently been attempted actively. Among them, polymers comprising aromatic polyethers excellent in heat resistance and high in film strength into which sulfonic acid groups are introduced, namely, aromatic polymers having sulfonic acid groups in side chains and having aromatic main chains are considered promising. For example, polymers of sulfonated polyether ketone type (JP-A-11-502249) and sulfonated polyether sulfone type (JP-A-10-45913, JP-A-10-21943) have been proposed. However, these are still unsatisfactory in proton conductivity.

On the other hand, polymers in which the main structure is polystyrene and the side chains have perfluoroalkylsulfonic acids which are high in acid strength (JP-A-2001-302721), namely, polymers in which the side chains have super strong acids and the main chain is aliphatic, are also known, but they are insufficient in heat resistance and film strength and are desired to be improved in these properties.

BRIEF SUMMARY OF THE INVENTION

As a result of an intensive research conducted by the inventors in an attempt to improve the above defects of conventional polymers having proton conductivity, it has been found that a specific polymer in which the side chain comprises a super strong acid group and the main chain is an aromatic polymer can attain the object. The polymer has excellent characteristics as proton conductive membranes of fuel cells, etc. As a result of additional various investigations, the present invention has been accomplished.

That is, the present invention provides a practically excellent aromatic polymer, characterized by having a super strong acid in the side chain, and a method for producing the same.

DETAILED DESCRIPTION OF THE INVENTION

The present invention will be explained in detail below.

The polymer of the present invention has one feature that the main chain is an aromatic polymer. The aromatic polymer means a polymer comprising mainly aromatic rings. The aromatic ring here includes, for example, monocyclic aromatic rings such as benzene; polycyclic aromatic rings such as naphthalene and biphenyl; hetrocyclic aromatic rings such as pyridine; and polyheterocyclic aromatic rings such as benzimidazole.

The aromatic polymers are not particularly limited as long as the main chain mainly comprises aromatic rings, and examples thereof are polymers such as of polyphenylene ether type, polynaphthylene type, polyphenylene type, polyphenylene sulfide type, polyether ether ketone type, polyether ether sulfone type, polysulfone type, polyether sulfone type, polyether ketone type and polybenzimidazole type. Of these polymers, especially preferred are those of polyphenylene ether type, polynaphthylene type, polyphenylene type, polyether sulfone type and polyether ether sulfone type.

The aromatic rings in these polymers may have one or more substituents in addition to the super strong acid groups as side chains, and examples of the substituents are hydroxyl group; alkyl groups of 1-6 carbon atoms, such as methyl, ethyl and propyl; alkoxy groups of 1-6 carbon atoms, such as methoxy and ethoxy; aralkyl groups of 7-12 carbon atoms, such as benzyl; aryl groups such as phenyl and naphthyl; halogen atoms such as fluorine atom, chlorine atom and bromine atom; etc. A plurality of substituents may be contained, and, in this case, these may be different. Of these substituents, the fluorine atom is preferred.

The polymers of the present invention are characterized in that they have one or more super strong acid groups in the side chain in addition to the main chain being an aromatic polymer as mentioned above. The super strong acid group here means an acid which is substantially stronger than 100% sulfuric acid ("Handbook of Chemistry (Kagaku Binran), Basic Volume (II), revised 4th edition, page 324, edited by Japan Chemical Society (published from Maruzen Co., Ltd.)).

As the super strong acids, mention may be made of, for example, the groups shown by the following formulas (2a)-(2d).

-G-SO$_3^-$W$^+$  (2a)

-G-SO$_2$N$^-$W$^+$SO$_2$-E  (2b)

-G-P(O)(O$^-$W$^+$)$_2$  (2c)

G-P(O)O$^-$W$^+$-E  (2d)

(in the formulas, G represents an alkylene group in which a part or all of hydrogen atoms are substituted with fluorine, an aralkylene group in which a part or all of hydrogen atoms are substituted with fluorine, or an arylene group in which a part or all of hydrogen atoms are substituted with fluorine, W$^+$ represents a cation, E represents an alkyl group in which a part or all of hydrogen atoms are substituted with fluorine, an aralkyl group in which a part or all of hydrogen atoms are substituted with fluorine, or an aryl group in which a part or all of hydrogen atoms are substituted with fluorine).

Typical examples of W$^+$ are hydrogen ion, alkali metal ions such as sodium ion and lithium ion, etc. In the case of using the polymers for fuel cells, hydrogen ion is preferred.

As to G, the alkylene group has usually about 1-6 carbon atoms, the aralkylene group has usually about 7-12 carbon atoms, and the arylene group has usually about 6-10 carbon atoms. Among them, G is preferably an alkylene group in which all of hydrogen atoms are substituted with fluorine, an aralkylene group in which all of hydrogen atoms are substituted with fluorine, or an arylene group in which all of hydrogen atoms are substituted with fluorine. Preferred examples of G are difluoromethylene group, tetrafluoroethylene group, hexafluoropropylene group, hexafluorobenzylene group, tetrafluorophenylene group, hexafluoronaphthylene group, etc.

As to E, the alkyl group has usually about 1-6 carbon atoms, the aralkyl group has usually about 7-12 carbon atoms, and the aryl group has usually about 6-10 carbon atoms. Among them, E is preferably an alkyl group in which all of hydrogen atoms are substituted with fluorine, an aralkyl group in which all of hydrogen atoms are substituted with fluorine, or an aryl group in which all of hydrogen atoms are substituted with fluorine. Preferred examples of E are trifluoromethyl group, pentafluoroethyl group, heptafluoropropyl group, heptafluorobenzyl group, pentafluorophenyl group, heptafluoronaphthyl group, etc.

Preferred examples of the super strong acids of the above (2a) are the following L-1-L-5.

L-1

L-2

L-3

L-4

L-5

Preferred examples of the super strong acids of the above (2b) are the following L-6-L-30.

-CF$_2$SO$_2$NHSO$_2$CF$_3$ -CF$_2$SO$_2$NHSO$_2$CF$_2$CF$_3$- CF$_2$SO$_2$NHSO$_2$ (CF$_2$)$_2$CF$_3$ L-6 L-7 L-8 -CF$_2$CF$_2$SO$_2$NHSO$_2$CF$_3$ -CF$_2$CF$_2$SO$_2$NHSO$_2$CF$_2$CF$_3$- CF$_2$CF$_2$SO$_2$NHSO$_2$ (CF$_2$)$_2$CF$_3$ L-9 L-10 L-11 -(CF$_2$)$_3$SO$_2$NHSO$_2$CF$_3$-(CF$_2$)$_3$SO$_2$NHSO$_2$CF$_2$CF$_3$-(CF$_2$)$_3$SO$_2$NHSO$_2$CF$_2$CF$_2$CF$_3$ L-12 L-13 L-14

L-15

L-16

L-17

L-18

L-19

L-20

L-21

L-22

L-23

L-24

L-25

L-26

L-27

L-28

L-29

L-30

Preferred examples of the super strong acids of the above (2c) are the following L-31-L-35.

-CF$_2$P(O) (OH)$_2$-CF$_2$CF$_2$P(O) (OH)$_2$-CF$_2$CF$_2$CF$_2$P(O)(OH)$_2$ L-31 L-32 L-33

L-34

L-35

Preferred examples of the super strong acids of the above (2d) are the following L-36-L-60.

-CF$_2$P(O) (OH)CF$_3$-CF$_2$P(O) (OH)CF$_2$CF$_3$-CF$_2$P(O) (OH)CF$_2$CF$_2$CF$_3$ L-36 L-37 L-38 -CF$_2$CF$_2$P(O) (OH)CF$_3$-CF$_2$CF$_2$P(O) (OH)CF$_2$CF$_3$-CF$_2$CF$_2$P(O) (OH)CF$_2$CF$_2$CF$_3$ L-39 L-40 L-41 -(CF$_2$) 3P(O) (OH)CF$_3$-(CF$_2$) 3P(O) (OH)CF$_2$CF$_3$-(CF$_2$) 3P(O) (OH)CF$_2$CF$_2$CF$_3$ L-42 L-43 L-44

L-45

L-46

L-47

L-48

L-49

L-50

L-51

L-52

L-53

L-54

L-55

L-56

L-57

L-58

L-59

L-60

Among the L-1-L-60 enumerated above, L-1-L-30 are preferred.

The polymers of the present invention are characterized in that the main chain is the aromatic polymer as mentioned above, and the side chain comprises one or more super strong acid groups as mentioned above. Typical examples of these polymers are those which contain, for example, a structure represented by the following formula (1).

$$-(A-Z)_m-(A'-Z')_n- \quad (1)$$

(in the above formula, A represents a divalent aromatic group, A' represents a divalent aromatic group comprising a super strong acid group as a substituent, Z and Z' independently of one another represent a direct bond or a divalent group, m and n represent the number of repeating units, n is in the range of 10-100,000 and the repeating units present in the number of n may be the same or different, and m is in the range of 0-100,000 and the repeating units present in the number of m may be the same or different).

Here, A represents a divalent aromatic group and typical examples thereof are divalent aromatic groups selected from the following formulas (3a)-(3c).

(3a)

-continued (3b)

(3c)

(in the above formulas, R represents a hydroxyl group, an alkyl group of 1-6 carbon atoms, an alkoxy group of 1-6 carbon atoms, an aralkyl group of 7-12 carbon atoms, an aryl group, or a halogen atom, p, r, s and t independently of one another represent a number of 0-4, q represents a number of 0-6, when a plurality of R are present, these may be the same or different, j represents a number of 0 or 1, Y represents a direct bond or a divalent group, and when a plurality of Y are present, these may be the same or different).

In the definition of R, examples of the alkyl group of 1-6 carbon atoms are methyl, ethyl, propyl, etc., examples of the alkoxy group of 1-6 carbon atoms are methoxy, ethoxy, etc., examples of the aralkyl group of 7-12 carbon atoms are benzyl, toluyl, etc., examples of the aryl group are phenyl, naphthyl, etc., and examples of the halogen atom are fluorine atom, chlorine atom, bromine atom, etc.

Furthermore, Y represents a direct bond or a divalent group, and examples thereof are a direct bond, —O—, —S—, —CO—, —SO$_2$—, alkylene groups of 1-12 carbon atoms, alkylenedioxy groups of 1-12 carbon atoms, etc. Preferred are a direct bond, —O—, —S—, —SO$_2$—, alkylene groups of 1-10 carbon atoms, alkylenedioxy groups of 1-10 carbon atoms, etc. When a plurality of Y are present, these may be the same or different. Examples of the alkylene group of 1-12 carbon atoms are methylene, ethylene, propylene, butylene, etc. Examples of the alkylenedioxy group of 1-12 carbon atoms are methylenedioxy, ethylenedioxy, etc.

A' in the formula (1) represents a divalent aromatic group comprising a super strong acid group as a substituent, and typical examples thereof are divalent aromatic groups selected from the following formulas (3d)-(3 g).

(3d)

(3e)

(3f)

(3g)

(in the formulas, R represents a hydroxyl group, an alkyl group of 1-6 carbon atoms, an alkoxy group of 1-6 carbon atoms, an aralkyl group of 7-12 carbon atoms, an aryl group, or a halogen atom, Z" and Y independently of one another represent a direct bond or a divalent group, and when a plurality of Z" are present, these may be the same or different, and when a plurality of Y are present, these may be the same or different, D represents a super strong acid group, and when a plurality of D are present, these may be the same or different, h, h" and h'" independently of one another represent a number of 1-4, h' represents a number of 1-6, (p'+h), (r'+h") and (s"+h'") independently of one another represent a number of 1-4, s', t', r" and t" independently of one another represent a number of 0-4, (q'+h') represents a number of 1-6, when a plurality of R are present, these may be the same or different, and j represents a number of 0 or 1).

Here, R and Y are the same as mentioned on A. D represents a super strong acid group, and examples of the super strong acid group are, for example, those selected from the above (2a)-(2d). Z" represents a direct bond or a divalent group, and examples thereof are a direct bond and the same divalent groups as Y, such as —O—, —S—, —CO—, —SO$_2$—, alkylene groups of about 1-12 carbon atoms and alkylenedioxy groups of about 1-12 carbon atoms, and additional examples are alkylene groups of about 1-12 carbon atoms substituted with fluorine, alkylenedioxy groups of about 1-12 carbon atoms substituted with fluorine, arylene groups of about 6-12 carbon atoms which may be substituted with fluorine, aryleneoxy groups of about 6-12 carbon atoms which may be substituted with fluorine, alkyleneoxy groups of about 1-12 carbon atoms which may be substituted with fluorine, etc.

Preferred are a direct bond, —O—, —S—, —SO$_2$—, alkylene groups of 1-10 carbon atoms, alkylenedioxy groups of 1-10 carbon atoms, alkylene groups of 1-10 carbon atoms substituted with fluorine, alkylenedioxy groups of 1-10 carbon atoms substituted with fluorine, arylene groups of 6-10 carbon atoms which may be substituted with fluorine, aryleneoxy groups of 6-10 carbon atoms which may be substituted with fluorine, and alkyleneoxy groups of 1-10 carbon atoms which may be substituted with fluorine.

Here, examples of the alkylene groups of 1-12 carbon atoms are methylene, ethylene, propylene, butylene, etc. Examples of the alkylenedioxy groups of 1-12 carbon atoms are methylenedioxy, ethylenedioxy, etc. Examples of the alkylene groups of about 1-12 carbon atoms substituted with fluorine are difluoromethylene, tetrafluoroethylene, hexafluoropropylene, octafluorobutylene, etc. Examples of the alkylenedioxy groups of 1-12 carbon atoms substituted with fluorine are 2,2,3,3-tetrafluorobutylenedioxy, 2,2-bis (trifluoromethyl)propylenedioxy, etc. Examples of the arylene groups of about 6-12 carbon atoms which may be substituted with fluorine are phenylene, tetrafluorophenylene, etc. Examples of the aryleneoxy groups of about 6-12 carbon atoms which may be substituted with fluorine are phenyleneoxy, tetrafluorophenyleneoxy, etc. Examples of the alkyleneoxy groups of about 1-12 carbon atoms which may be substituted with fluorine are methyleneoxy, difluoromethyleneoxy, ethyleneoxy, tetrafluoroethyleneoxy, etc.

Z and Z' in the formula (1) independently of one another represent a direct bond or a divalent group, and examples thereof are the same groups as those of Y. The symbols m and n represent the number of repeating units, n is usually in the range of 10-100,000 and the repeating units present in the number of n may be the same or different, and m is usually in the range of 0-100,000 and the repeating units present in the number of m may be the same or different. Preferably, n is in the range of 15-50,000 and m is in the range of 0-50,000, and more preferably, n is in the range of 20-10,000 and m is in the range of 0-10,000. The repeating units present in the number of n and the repeating units present in the number of m may take any linking such as block copolymer, random copolymer, alternating copolymer, multi-block copolymer and graft copolymer.

The number-average molecular weight of the polymers of the present invention is usually 5,000-500,000, preferably 10,000-300,000, more preferably 15,000-100,000.

The aromatic polymers of the present invention can be obtained, for example, by reacting a polymer represented by the following formula (4) with a compound represented by the following formula (5):

$$-(A-Z)_m-(A''-Z')_n- \quad (4)$$

(in the formula, A, Z, Z', m and n have the same meanings as defined above, and A" represents a group selected from the following formulas (4a)-(4d)):

$$E-D \quad (5)$$

(in the formula, D has the same meaning as above, and E represents a group which reacts with Z''' to form Z"), (in the formulas, R, Y, p', q', r', s', t', r", s", t", h, h', h", h'" and j have the same meanings as above, and Z''' represents a group which reacts with E to form Z")

Here, (i) when Z" is a direct bond, examples of combinations of E and Z''' are a combination of E and Z''' which are both halogen, and a combination of E and Z''' one of which is halogen and another of which is —Mg-halogen. Examples of the halogen are fluorine, chlorine, bromine and iodine, and chlorine, bromine and iodine are preferred.

(i-1) One of the methods for forming the direct bond by reacting E and Z''' which are both halogen is, for example, to react them in the presence of a metal. This method can be carried out without using solvents, but is preferably carried out in a solvent. As the solvent, there may be used, for example, hydrocarbon solvents, ether solvents, ketone solvents, amide solvents, sulfone solvents, sulfoxide solvents, etc. Among them, preferred are tetrahydrofuran, diethyl ether, dimethyl sulfoxide, sulfolane, N,N-dimethylformamide, N,N-dimethylacetamide, N-methylpyrrolidone, N,N'-dimethylimidazolidinone, etc. Examples of the metals are copper, sodium, lithium, potassium, zinc, iron, chromium, nickel, magnesium, etc. and preferred is copper, zinc or sodium. Amount of the metal used is usually not less than ½ equivalent of the total of halogenated alkyl and/or halogenated aryl. The reaction temperature is preferably −10° C.-250° C., more preferably 0° C.-200° C.

(i-2) The second method for forming the direct bond by reacting E and Z''' which are both halogen is, for example, to react one of the halogen with an alkyl metal or the like, followed by reacting with another halogen. This method can be carried out without using solvents, but is preferably carried out in a solvent, and it is preferred to use known catalysts depending on substrate, for example, nickel catalysts or palladium catalysts. As the solvent, there may be preferably used, for example, hydrocarbon solvents, ether solvents, amide solvents, sulfoxide solvents, etc. Examples of the hydrocarbon solvents are toluene, benzene, xylene, trimethybenzene, tetramethylbenzene, naphthalene, tetralin, octane, hexane, etc. Examples of the ether solvents are diethyl ether, diisopropyl ether, tetrahydrofuran, 1,4-dioxane, diphenyl ether, tert-butylmethyl ether, etc. Examples of the alkyl metals are alkyl lithium, alkyl zinc, alkyl aluminum, etc., and alkyl lithium is preferred. Examples of the alkyl lithium are butyl lithium, phenyl lithium, benzyl lithium, lithium diisopropylamide, etc. The reaction temperature is preferably −100° C.-100° C., more preferably −78° C.-60° C.

(i-3) As a method for forming the direct bond by the combination of E and Z''' one of which is halogen and another of which is —Mg-halogen, mention may be made of, for example, a method of reacting them by allowing them to contact with each other. This reaction can be carried out without using solvents, but is preferably carried out in a solvent, and it is preferred to use known catalysts depending on the substrate, for example, nickel catalysts or palladium catalysts. As the solvent, there may be preferably used, for example, hydrocarbon solvents and ether solvents. Examples of the hydrocarbon solvents are toluene, benzene, xylene, trimethylbenzene, tetramethylbenzene, naphthalene, tetralin, octane, hexane, etc. Examples of the ether solvents are diethyl ether, diisopropyl ether, tetrahydrofuran, 1,4-dioxane, diphenyl ether, tert-butylmethyl ether, etc. The reaction temperature is preferably −100° C.-100° C., more preferably −78° C.-60° C.

(ii) When Z" is —O—, examples of combinations of E and Z''' are a combination of E and Z''' one of which is a hydroxyl group and another of which is halogen. Examples of halogen are fluorine, chlorine, bromine and iodine. The —O— bond can be formed by contacting them in the presence of a base. This reaction can be carried out without using solvents, but is preferably carried out in a solvent. As the solvent, there may be used, for example, aromatic hydrocarbon solvents, ether solvents, ketone solvents, amide solvents, sulfone solvents, sulfoxide solvents, etc. Among them, preferred are tetrahydrofuran, diethyl ether, dimethyl sulfoxide, sulfolane, N,N-dimethylformamide, N,N-dimethylacetamide, N-methylpyrrolidone, N,N'-dimethylimidazolidinone, etc. The base is not particularly limited, and examples thereof are sodium hydroxide, potassium hydroxide, potassium carbonate, metallic sodium, metallic potassium, metallic lithium, sodium hydride, potassium hydride, lithium hydride, triethylamine, pyridine, etc. The reaction temperature is preferably −10° C.-250° C., more preferably 0° C.-200° C.

(iii) When Z" is —S—, examples of combinations of E and Z'" are a combination of E and Z'" one of which is —SH and another of which is halogen, and others. Examples of halogen are fluorine, chlorine, bromine and iodine. The —S— bond can be formed by reacting them in the presence of an alkali. This reaction can be carried out without using solvents, but is preferably carried out in a solvent. As the solvent, there may be used, for example, aromatic hydrocarbon solvents, ether solvents, ketone solvents, amide solvents, sulfone solvents, sulfoxide solvents, etc. Among them, preferred are tetrahydrofuran, diethyl ether, dimethyl sulfoxide, sulfolane, N,N-dimethylformamide, N,N-dimethylacetamide, N-methylpyrrolidone, N,N'-dimethylimidazolidinone, etc. The alkali is not particularly limited, and examples thereof are sodium hydroxide, potassium hydroxide, potassium carbonate, metallic sodium, metallic potassium, metallic lithium, sodium hydride, potassium hydride, lithium hydride, triethylamine, pyridine, etc. The reaction temperature is preferably −10° C.-250° C., more preferably 0° C.-200° C.

(iv) When Z" is —CO—, examples of combinations of E and Z'" are a combination of E and Z'" one of which is a carboxylic acid halide and another of which is hydrogen atom, and others. Examples of the carboxylic acid halide are carboxylic acid chloride, carboxylic acid fluoride, etc. As this reaction, mention may be made of, for example, a method of carrying out the reaction in the presence of a Lewis acid catalyst. This reaction can be carried out in molten state without using solvents, but a solvent can also be used. As the solvent, there may be preferably used, for example, aliphatic hydrocarbon solvents such as hexane and heptan, carbon disulfide, carbon tetrachloride, nitrobenzene, dichlorobenzene, nitromethane, etc. Examples of the Lewis acid are aluminum chloride, antimony chloride, iron chloride, titanium chloride, bismuth chloride, zinc chloride, etc., and aluminum chloride is preferred. The reaction temperature is preferably −10° C.-250° C., more preferably 0° C.-200° C.

(v) When Z" is —SO$_2$—, examples of combinations of E and Z'" are a combination of E and Z'" one of which is a sulfonyl halide group and another of which is hydrogen atom, and others. Examples of the sulfonyl halide group are sulfonyl chloride, sulfonyl fluoride, etc. The —SO$_2$— can be formed by allowing them to contact with each other. As this reaction, mention may be made of, for example, a method of carrying out the reaction in the presence of a Lewis acid catalyst. This reaction can be carried out in molten state without using solvents, but a solvent can also be used. As the solvent, there may be preferably used, for example, aliphatic hydrocarbon solvents such as hexane and heptan, carbon disulfide, carbon tetrachloride, nitrobenzene, dichlorobenzene, nitromethane, etc. Examples of the Lewis acid are aluminum chloride, antimony chloride, iron chloride, titanium chloride, bismuth chloride, zinc chloride, etc., and aluminum chloride is preferred. The reaction temperature is preferably −10° C.-250° C., more preferably 0° C.-200° C.

(vi) When Z" is an alkylene group of 1-12 carbon atoms or an alkylene group of 1-12 carbon atoms substituted with fluorine, examples of combinations of E and Z'" are a combination of E and Z'" one of which is a halogenated alkyl group or a halogenated alkyl group further substituted with fluorine and another of which is halogen, and others. Examples of halogen are chlorine, bromine and iodine. The halogenated alkyl groups or halogenated alkyl groups further substituted with fluorine include, for example, chloromethyl, bromomethyl, iodomethyl, chlorodifluoromethyl, bromodifluoromethyl, iododifluoromethyl, chloroethyl, bromoethyl, iodoethyl, chlorotetrafluoroethyl, bromotetrafluoroethyl, iodotetrafluoroethyl, chloropropyl, bromopropyl, iodopropyl, chlorohexafluoropropyl, bromohexafluoropropyl, iodohexafluoropropyl, chlorobutyl, bromobutyl, iodobutyl, chlorooctafluorobutyl, bromooctafluorobutyl, iodooctafluorobutyl, etc. Preferred are bromomethyl, iodomethyl, bromodifluoromethyl, iododifluoromethyl, bromoethyl, iodoethyl, bromotetrafluoroethyl, iodotetrafluoroethyl, bromopropyl, iodopropyl, bromohexafluoropropyl, iodohexafluoropropyl, bromobutyl, iodobutyl, bromooctafluorobutyl, iodooctafluorobutyl, etc. As a method for carrying out the reaction, mention may be made of the same methods as in (i-1) and (i-2).

(vii) When Z" is an alkylenedioxy group of 1-12 carbon atoms which may be substituted with fluorine, examples of combinations of E and Z'" are a combination of E and Z'" one of which is a halogenated alkyleneoxy group which may be further substituted with fluorine and another of which is hydroxyl group, a combination one of which is hydroxylated alkyleneoxy group and another of which is halogen, and others. Examples of halogen are chlorine, bromine and iodine.

Examples of the halogenated alkyleneoxy groups which may be further substituted with fluorine are chloromethyleneoxy, bromomethyleneoxy, iodomethyleneoxy, chlorodifluoromethyleneoxy, bromodifluoromethyleneoxy, iododifluoromethyleneoxy, chloroethyleneoxy, bromoethyleneoxy, iodoethyleneoxy, chlorotetrafluoroethyleneoxy, bromotetrafluoroethyleneoxy, iodotetrafluoroethyleneoxy, chloropropyleneoxy, bromopropyleneoxy, iodopropyleneoxy, chlorohexafluoropropyleneoxy, bromohexafluoropropyleneoxy, iodohexafluoropropyleneoxy, chlorobutyleneoxy, bromobutyleneoxy, iodobutyleneoxy, chlorooctafluorobutyleneoxy, bromooctafluorobutyleneoxy, iodooctafluorobutyleneoxy, etc. Preferred are bromodifluoromethyleneoxy, iododifluoromethyleneoxy, bromotetrafluoroethyleneoxy group, iodotetrafluoroethyleneoxy, bromohexafluoropropyleneoxy, iodohexafluoropropyleneoxy, bromooctafluorobutyleneoxy, iodooctafluorobutyleneoxy, etc. Examples of the hydroxylated alkyleneoxy groups are hydroxymethyleneoxy, hydroxyethyleneoxy, hydroxypropyleneoxy, hydroxybutyleneoxy, 1-hydroxy-2,2-difluoroethyleneoxy, 1-hydroxy-2,2,3,3-tetrafluoropropyleneoxy, 1-hydroxy-2,2,3,3,4,4-hexafluorobutyleneoxy, 1-hydroxy-2,2-dimethylpropyleneoxy, 1-hydroxy-2,2-bis(trifluoromethyl)propyleneoxy, etc. Preferred are hydroxyethyleneoxy, hydroxypropyleneoxy, 1-hydroxy-2,2-difluoroethyleneoxy, 1-hydroxy-2,2,3,3-tetrafluoropropyleneoxy, 1-hydroxy-2,2,3,3,4,4-hexafluorobutyleneoxy, etc. As the method for carrying out any of the reactions, the same reaction conditions as in the above (ii) can be used for any combinations.

(viii) When Z" is an arylene group of about 6-12 carbon atoms which may be substituted with fluorine, examples of combinations of E and Z'" are a combination of E and Z'" one of which is halogen and another of which is a halogenated aryl group, and others. Examples of halogen are fluorine, chlorine, bromine and iodine. The halogenated aryl groups include, for example, fluorophenyl, chlorophenyl, bromophenyl, iodophenyl, pentafluorophenyl, nonafluorobiphenyl, etc. Preferred are fluorophenyl and pentafluorophenyl. As a method for carrying out the reaction of them, mention may be made of the same methods as in (i-1) and (i-2).

(ix) When Z" is an aryleneoxy group of about 6-12 carbon atoms which may be substituted with fluorine, examples of combinations of E and Z'" are a combination of E and Z'" one of which is a hydroxyl group and another of which is a halogenated aryl group, and others. Examples of the halogenated aryl groups are the same as enumerated in (viii). For carrying out the reaction of them, the same methods as of (ii) can be used.

(x) When Z" is an alkyleneoxy group of about 1-12 carbon atoms which may be substituted with fluorine, examples of combinations of E and Z'" are a combination of E and Z'" one of which is a halogen and another of which is a halogenated alkyleneoxy group which may be further substituted with fluorine, and others. Examples of halogen are chlorine, bromine and iodine. The halogenated alkyleneoxy groups which may be substituted with fluorine include, for example, chloromethyleneoxy, bromomethyleneoxy, iodomethyleneoxy, chlorodifluoromethyleneoxy, bromodifluoromethyleneoxy, iododifluoromethyleneoxy, chloroethyleneoxy, bromoethyleneoxy, iodoethyleneoxy, chlorotetrafluoroethyleneoxy, bromotetrafluoroethyleneoxy, iodotetrafluoroethyleneoxy, chloropropyleneoxy, bromopropyleneoxy, iodopropyleneoxy, chlorohexafluoropropyleneoxy, bromohexafluoropropyleneoxy, iodohexafluoropropyleneoxy, chlorobutyleneoxy, bromobutyleneoxy, iodobutyleneoxy, chlorooctafluorobutyleneoxy, bromooctafluorobutyleneoxy, iodooctafluorobutyleneoxy, etc. Preferred are bromodifluoromethyleneoxy, iododifluoromethyleneoxy, bromotetrafluoroethyleneoxy, iodotetrafluoroethyleneoxy, bromohexafluoropropyleneoxy, iodohexafluoropropyleneoxy, bromooctafluorobutyleneoxy, iodooctafluorobutyleneoxy, etc. As methods for carrying out the reaction of them, mention may be made of the same methods as in (i-1) and (i-2).

The aromatic polymer of the present invention can be obtained by reacting a polymer represented by the formula (4) with a compound represented by the formula (5) as aforementioned.

Here, the polymer represented by the formula (4), namely, the polymer (4) having Z'" is obtained, for example, by the following methods, namely, (a) a method of introducing Z'" into a corresponding precursor polymer through a polymeric reaction, (b) a method of polymerizing a corresponding monomer having Z'", and (c) a method of polymerizing a corresponding monomer having protected Z'" and subjecting the resulting polymer to eliminate the protecting group.

The method (a) includes, for example, a method of introducing a halogen as Z'" into a precursor polymer through a polymeric reaction, and examples of the method are a method of introducing bromine by the reaction with N-bromosuccinimide, a method of directly acting chlorine gas, bromine, iodine, or the like, a method of converting hydroxyl group to bromine group using phosphorus tribromide, and a method of chlorinating hydroxyl group using thionyl chloride (MacMary, "Organic Chemistry (Yuki Kagaku)", the first volume, pages 291-296, Tokyo Kagaku Dojin, 1992). As a method of introducing —OH as Z'", mention may be made of, for example, a method of subjecting the above polymer into which halogen is introduced to nucleophilic substitution reaction with a hydroxide ion.

The method (b) includes, for example, a method of polymerizing a monomer having halogen which does not participate in the reaction. Examples of the method are a method of carrying out polycondensation using a monomer having halogen which does not react at the time of polymerization, and a method of carrying out oxidative polymerization using a monomer having halogen which does not react at the time of polymerization, such as 2,6-difluorophenol. The method of carrying out polycondensation using a monomer having halogen which does not react at the time of polymerization includes, for example, a method of using 2-chlorohydroquinone as the monomer. In this case, the two hydroxyl groups are used for the reaction, but the chlorine atom does not participate in the reaction, and therefore the chlorine atoms are introduced into the polymer produced. The method of carrying out oxidative polymerization using a monomer having halogen which does not react at the time of polymerization includes, for example, a method of using 2,6-difluorophenol as the monomer. In this case, since the fluorine atoms do not participate in the oxidative polymerization, the fluorine atoms are introduced into the polymer produced.

The method (c) includes, for example, a method of carrying out the polymerization reaction with protecting the hydroxyl group with trialkylsilyl group or methyl group and eliminating the trialkylsilyl group of the resulting polymer to obtain a polymer having hydroxyl group. An example of the method is a method of producing a polymer by polycondensation of 2-methoxyhydroquinone obtained by protecting one of hydroxyl groups of 2-hydroxyhydroquinone with methyl group and then carrying out eliminating the methyl group to obtain a polymer having hydroxyl group as Z'".

The above precursor polymer is not particularly limited as long as the main chain comprises mainly aromatic rings as aforementioned, and examples thereof are polymers such as of polyphenylene ether type, polynaphthylene type, polyphenylene type, polyphenylene sulfide type, polyether ether ketone type, polyether ether sulfone type, polysulfone type, polyether sulfone type, polyether ketone type and polybenzimidazole type. Of these polymers, especially preferred are polyphenylene ether type, polynaphthylene type, polyphenylene type, polyether sulfone type and polyether ether sulfone type.

The method for producing the precursor polymer is not particularly limited, and the methods for producing polyphenylene ether type polymer or polynaphthylene type polymer include, for example, oxidative polymerization of a corresponding monomer by a known method.

For example, monomers used for producing polyphenylene ether type polymers are not particularly limited, and as examples of the monomers, mention may be made of phenol, 2-methylphenol, 2,6-dimethylphenol, 2-phenylphenol, 2,6-diphenylphenol, 2-methyl-6-hydroxyphenol, 2,6-dihydroxyphenol, 2-hydroxyphenol, 2,6-dihydroxyphenol, 2-methyl-6-hydroxyphenol, 2,6-difluorophenol, 2,6-dibromophenol, etc. These monomers may have substituents, and, furthermore, a part or all of hydrogen atoms of the monomers may be substituted with fluorine atoms. These monomers may be mixtures of two or more.

Monomers used for producing polynaphthylene type polymers are not particularly limited, and examples thereof are 2,3-dihydroxynaphthalene, 5,8-dihydroxynaphthalene, 2,6-dihydroxynaphthalene, 3,7-dihydroxynaphthalene, 4,8-dihydroxynaphthalene, 4,5-dihydroxynaphthalene, 2,7-dihydroxynaphthalene, 1,5-dihydroxynaphthalene, 1,8-dihydroxynaphthalene, etc. These monomers may have substituents, and, furthermore, a part or all of hydrogen atoms of the monomers may be substituted with fluorine atoms. These monomers may be mixtures of two or more.

In case the monomers have functional groups which may bring about side reactions, the functional groups which may bring about side reactions are protected by known methods, thereafter polymerization is carried out, and the resulting polymers are subjected to eliminate the protecting group, thereby to obtain polymers having functional groups. One example of this method comprises protecting hydroxyl group with alkoxy group or siloxy group, then carrying out polymerization to obtain a polymer, and then eliminating the protecting group under suitable conditions.

The catalyst systems used for the oxidative polymerization are not particularly limited, and known catalyst systems such as metal halides or metal halide/amine complexes can be used. As the metal halides, there may be used, for example, monovalent, divalent or trivalent halides of metals such as copper, iron, vanadium and chromium. As the amines, there may be used, for example, pyridine, lutidine, 2-methylimidazole, N,N,N',N'-tetramethylethylenediamine, etc. The metal halide/amine complexes can be produced by mixing a metal halide and an amine in a solvent in the presence of oxygen. The mixing ratio of the metal halide and the amine is not particularly limited, and is, for example, metal halide:amine=1:0.1 to 1:200 (mol:mol), preferably 1:0.3 to 1:100 (mol:mol).

The solvent used in the oxidative polymerization is not particularly limited as long as it does not poison the catalyst, and there may be used, for example, hydrocarbon solvents, ether solvents, alcohol solvents, etc. Examples of the hydrocarbon solvents are toluene, benzene, xylene, dichlorobenzene, nitrobenzene, trimethylbenzene, tetramethylbenzene, naphthalene, tetralin, etc. Examples of the ether solvents are diethyl ether, diisopropyl ether, tetrahydrofuran, 1,4-dioxane, diphenyl ether, tert-butylmethyl ether, etc. Examples of the alcohol solvents are methanol, ethanol, isopropanol, 2-methoxyethanol, etc.

The reaction temperature is not particularly limited, and is −100° C.-100° C., preferably −50° C.-50° C.

When the precursor polymer is a copolymer, this can be produced, for example, by a method which comprises mixing two or more monomers and polymerizing them, a method which comprises polymerizing one monomer and then adding a second monomer or a polymer. By using these methods or combining these methods, it is possible to produce block copolymers, random copolymers, alternating copolymers, multi-block copolymers or graft copolymers.

When the precursor polymer is a polyphenylene, the method for producing it is not particularly limited, and, for example, it can be produced by subjecting a corresponding alkyl dihalide or aryl dihalide to Yamamoto polymerization.

Here, the monomers are preferably aryl dihalides. More preferred are 1,4-dichlorobenzene, 1,4-dibromobenzene, 1,3-dichlorobenzene, 1,3-dibromobenzene, 1,4-dichloronaphthalene, 1,4-dibromonaphthalene, 1,5-dichloronaphthalene, 1,5-dibromonaphthalene, 2,6-dichloronaphthalene, 2,6-dibromonaphthalene, 2,7-dichloronaphthalene, 2,7-dibromonaphthalene, 4,4'-dichlorobiphenyl, 4,4'-dibromobiphenyl, 2,2'-dichlorobiphenyl, 2,2'-dibromobiphenyl, 1,4-dichloro-2-hydroxybenzene, 1,4-dibromo-2-hydroxybenzene, 1,3-dichloro-4-hydroxybenzene, 1,3-dichloro-5-hydroxybenzene, 1,3-dibromo-4-hydroxybenzene, 1,3-dibromo-5-hydroxybenzene, 1,4-dichloro-2,3-dihydroxynaphthalene, 1,4-dibromo-2,3-dihydroxynaphthalene, 1,5-dichloro-2,7-dihydroxynaphthalene, 1,5-dibromo-2,7-dihydroxynaphthalene, 2,6-dichloro-1,5-dihydroxynaphthalene,2,6-dibromo-2,7-dihydroxynaphthalene, 2,7-dichloro-1,8-dihydroxynaphthalene, 2,7-dibromo-1,8-dihydroxynaphthalene, 4,4'-dichloro-2,2'-dihydroxybiphenyl, 4,4'-dichloro-3,3'-dihydroxybiphenyl, 4,4'-dibromo-2,2'-dihydroxybiphenyl, 4,4'-dibromo-3,3'-dihydroxybiphenyl, 2,2'-dichloro-4,4'-dihydroxybiphenyl, 2,2'-dibromo-4,4'-dihydroxybiphenyl, etc. These monomers may have substituents as exemplified above, and these monomers may be mixtures of two or more.

In case the monomers have functional groups which may bring about side reactions, the functional groups which may bring about side reactions are protected by known methods, thereafter polymerization is carried out, and the resulting polymers are subjected to eliminate the protecting group under suitable conditions, whereby polymers having functional groups can be obtained. One example of this method comprises protecting hydroxyl group with alkoxy group or siloxy group, then carrying out the polymerization to obtain a polymer, and then eliminating the protecting group under suitable conditions.

Examples of the catalysts used in the Yamamoto polymerization are nickel compounds of zero valence, and preferred are tris(2,2'-bipyridine)nickel bromide, dibromobis(triphenylphosphine)nickel, etc. These catalysts can be produced by known nethods.

As the solvents, there may be used, for example, hydrocarbon solvents, ether solvents, amide solvents, acetonitrile, dimethylsulfoxide, etc. Examples of the hydrocarbon solvents are toluene, benzene, xylene, trimethybenzene, tetramethylbenzene, naphthalene, tetralin, etc. Examples of the ether solvents are diethyl ether, diisopropyl ether, tetrahydrofuran, 1,4-dioxane, diphenyl ether, tert-butylmethyl ether, etc. Examples of the amide solvents are N,N-dimethylformamide, N,N-dimethylacetamide, etc.

The reaction temperature is not particularly limited, and is preferably 0° C.-100° C. When a copolymer is produced, this can be produced, for example, by a method which comprises mixing two or more monomers and polymerizing them, a method which comprises polymerizing one monomer and then adding a second monomer. By using these methods or combining these methods, it is possible to produce block copolymers, random copolymers, alternating copolymers, multi-block copolymers or graft copolymers.

Furthermore, when the precursor polymers are polyether sulfones, commercially available ones may be used, but those which are obtained by polymerization may be used. The commercially available polyether sulfones include, for example, SUMIKAEXCEL PES3600P, PES4100P, PES4800P, PES5200P (trademarks for the products of Sumitomo Chemical Co., Ltd., the same applying to the following). The method for obtaining polyether sulfones is not particularly limited, and an example is to react a dihalogenated diphenyl sulfone and a diol in the presence of an alkali.

Examples of the dihalogenated diphenyl sulfones are 4,4'-difluorodiphenyl sulfone, 4,4'-dichlorodiphenyl sulfone, 4,4'-dibromodiphenyl sulfone, 2,2'-difluorodiphenyl sulfone, 2,2'-dichlorodiphenyl sulfone, 2,2'-dibromodiphenyl sulfone, 2,4'-difluorodiphenyl sulfone, 2,4'-dichlorodiphenyl sulfone, 2,4'-dibromodiphenyl sulfone, etc. These monomers may have further substituents, and, furthermore, a part or all of hydrogen atoms of the monomers may be substituted with fluorine atoms. These monomers may be mixtures of two or more.

Here, examples of the diols are hydroquinone, 2-methoxyhydroquinone, 2-chlorohydroquinone, resorcinol, catechol, 1,2-dihydroxynaphthalene, 1,4-dihydroxynaphthalene, 1,5-dihydroxynaphthalene, 2,6-dihydroxynaphthalene, 2,7-dihydroxynaphthalene, 4,4'-dihydroxybiphenyl, 2,4'-dihydroxybiphenyl, 2,2'-dihydroxybiphenyl, 4,4'-dihydroxydiphenylmethane, 1,1-bis(4-hydroxyphenyl) ethane, 1,1-bis(4-hydroxyphenyl)cyclohexane, 2,2-bis(4-hydroxyphenyl) propane, 2,2-bis(4-hydroxyphenyl)butane, 1,1-bis(4-hydroxyphenyl)cyclohexane, 2,2-bis(4-hydroxyphenyl)-1,1,1,3,3,3-hexafluoropropane, 1,1-bis(4-hydroxyphenyl)-1-phenylethane, bis(4-hydroxyphenyl)diphenylmethane, 9,9-bis(4-hydroxyphenyl)fluorene, α, α'-bis(4-hydroxyphenyl)-1,4-diisopropylbenzene, 4,4'-dihydroxydiphenyl ether, 2,2'-dihydroxydiphenyl ether, bis(4-hydroxyphenyl) sulfide, bis(2-hydroxyphenyl) sulfide, 1,2-bis(4-hydroxyphenyl) ethane, 1,2-bis(4-hydroxyphenoxy)ethane, 1,2-bis(3-hydroxyphenoxy)ethane, 1,2-bis(4-hydroxyphenoxy) propane, 1,3-bis(4-hydroxyphenoxy)propane, 1,4-bis(4-hydroxyphenoxy)butane, 1,6-bis(4-hydroxyphenoxy) hexane, diethylene glycol bis(4-hydroxyphenyl) ether, etc. These monomers may have substituents, and, furthermore, a part or all of hydrogen atoms of the monomers may be substituted with fluorine atoms. These monomers may be mixtures of two or more.

The alkalis are not particularly limited, and examples thereof are sodium hydroxide, potassium hydroxide, potassium carbonate, metallic sodium, metallic potassium, metallic lithium, sodium hydride, potassium hydride, lithium hydride, triethylamine, pyridine, etc.

The reaction can be carried out in molten state without using solvents, but is preferably carried out in a solvent. As the solvent, there may be used, for example, aromatic hydrocarbon solvents, ether solvents, ketone solvents, amide solvents, sulfone solvents, sulfoxide solvents, etc. Among them, dimethyl sulfoxide, sulfolane, N,N-dimethylformamide, N,N-dimethylacetamide, N-methylpyrrolidone, N,N'-dimethylimidazolidinone, etc. are preferred because these are high in dissolvability.

The reaction temperature is not particularly limited, and is preferably 20° C.-250° C., more preferably 50° C.-200° C.

When a copolymer is produced, this can be produced, for example, by a method which comprises mixing two or more monomers and polymerizing them, and a method which comprises polymerizing one monomer and then adding a second monomer or a polymer. By using these methods or combining these methods, it is possible to produce block copolymers, random copolymers, alternating copolymers, multi-block copolymers or graft copolymers.

Furthermore, the aromatic polymer of the present invention can also be produced by reacting the polymer of the formula (4) with a compound represented by the following formula (6) and then converting D' to a super strong acid group D.

E-D'  (6)

(in the formula (6), E has the same meanings as defined above, and D' represents a group capable of being converted to D).

As a method for forming Z" by reacting E and Z''', mention may be made of the same reactions as aforementioned.

Examples of D' capable of being converted to super strong acid group D are perfluoroalkylene halides, perfluoroalkylenesulfonyl halides, perfluoroalkylene thiols, perfluoroalkylene sulfides, perfluoroalkylene disulfides, perfluoroalkylenesulfinic acids, perfluoroalkylene thiocyanates, perfluoroalkylene thioketones, etc. Examples of halogens of the perfluoroalkylene halides are iodine, bromine, chlorine, etc., and examples of halogens of perfluoroalkylenesulfonyl halides are chlorine, fluorine, etc.

As a method for converting a perfluoroalkylene halide to a super strong acid group, there is a method of reacting the perfluoroalkylene halide with a sulfite such as sodium sulfite, potassium sulfite, sodium hydrogensulfite or potassium hydrogensulfite and/or a hypothionite such as sodium hypothionite or potassium hypothionite. The reaction temperature is usually 0° C.-200° C., preferably 50° C.-150° C. The reaction of the perfluoroalkylene halide with sulfite and/or hypothionite is usually carried out in a solvent. The solvent is not particularly limited, and water, a mixed solvent of water/organic solvent and an organic solvent are used. As the organic solvent, there may be used, for example, hydrocarbon solvents, ether solvents, ketone solvents, amide solvents, sulfone solvents, sulfoxide solvents, etc. Preferred are water, hydrocarbon solvents, ether solvents, amide solvents and sulfoxide solvents are used. Examples of the hydrocarbon solvents are toluene, benzene, xylene, trimethybenzene, tetramethylbenzene, naphthalene, tetralin, octane, hexane, etc. Examples of the ether solvents are diethyl ether, diisopropyl ether, tetrahydrofuran, 1,4-dioxane, diphenyl ether, tert-butylmethyl ether, etc. Examples of the amide solvents are N,N-dimethylformamide, N,N-dimethylacetamide, N-methylpyrrolidone, etc. Examples of the sulfoxide solvents are dimethyl sulfoxide, etc.

As a method for converting a perfluoroalkylenesulfonyl halide to a super strong acid group, mention may be made of, for example, a method of carrying out hydrolysis to produce sulfonic acid, a method of reacting with a perfluoroalkylenesulfonyl amide to produce sulfonyl imide.

Here, the reaction of hydrolyzing perfluoroalkylenesulfonyl halide to produce sulfonic acid can be performed by allowing water to act, and the reaction can be accelerated by allowing to be present an alkali such as sodium hydroxide, potassium hydroxide, pyridine, lutidine, quinoline, or trimethylamine. The reaction temperature is usually 0° C.-200° C., preferably 50° C.-150° C. The hydrolysis reaction can be carried out without using solvents, but can also be carried out in a suitable solvent. The solvent is not particularly limited, and water, a mixed solvent of water/organic solvent and an organic solvent are used. As the organic solvent, there may be used, for example, hydrocarbon solvents, ether solvents, ketone solvents, amide solvents, sulfone solvents, sulfoxide solvents, etc. Preferred are water, hydrocarbon solvents, ether solvents, amide solvents, and sulfoxide solvents. Examples of the hydrocarbon solvents are toluene, benzene, xylene, trimethybenzene, tetramethylbenzene, naphthalene, tetralin, octane, hexane, etc. Examples of the ether solvents are diethyl ether, diisopropyl ether, tetrahydrofuran, 1,4-dioxane, diphenyl ether, tert-butylmethyl ether, etc. Examples of the amide solvents are N,N-dimethylformamide, N,N-dimethylacetamide, N-methylpyrrolidone, etc. Examples of the sulfoxide solvents are dimethyl sulfoxide, etc.

For reacting perfluoroalkylenesulfonyl halide with perfluoroalkylenesulfonyl amide to produce sulfonyl imide, there may be used, for example, a method disclosed in the known literature (J. Fluorine. Chem., 105, 129 (2000)).

As a method for converting perfluoroalkylene thiols, perfluoroalkylene sulfides, perfluoroalkylene disulfides, perfluoroalkylenesulfinic acids, perfluoroalkylene thiocyanates, perfluoroalkylene thioketones, perfluorothiocarbonate esters, etc. to super strong acid groups, there is, for example, a method of oxidation. For carrying out the oxidation reaction, mention may be made of a method of using, for example, nitric acid, hydrogen peroxide, bromine water, hypochlorites, hypobromites, potassium permanganate, chromic acid, etc. The reaction temperature is usually 0° C.-200° C., preferably 50° C.-150° C. The oxidative reaction can be carried out without using solvents, but can also be carried out in a suitable solvent. The solvent is not particularly limited, and water, a mixed solvent of water/organic solvent and an organic solvent are used. As the organic solvent, there may be used, for example, hydrocarbon solvents, ether solvents, ketone solvents, amide solvents, sulfone solvents, sulfoxide solvents, etc. Preferred are water, hydrocarbon solvents, ether solvents, amide solvents, and sulfoxide solvents. Examples of the hydrocarbon solvents are toluene, benzene, xylene, trimethybenzene, tetramethylbenzene, naphthalene, tetralin, octane, hexane, etc. Examples of the ether solvents are diethyl ether, diisopropyl ether, tetrahydrofuran, 1,4-dioxane, diphenyl ether, tert-butylmethyl ether, etc. Examples of the amide solvents are N,N-dimethylformamide, N,N-dimethylacetamide, N-methylpyrrolidone, etc. Examples of the sulfoxide solvents are dimethyl sulfoxide, etc.

The aromatic polymer of the present invention can also be produced by a method of polymerizing a monomer having a super strong acid group in the side chain in addition the methods as mentioned above.

As the monomer having a super strong acid group in the side chain, mention may be made of, for example, a compound represented by the following formula (7).

V-A'-V (7)

(in the above formula, A' has the same meanings as defined above and V represents a halogen, a hydroxyl group, a thiol group, an amino group, a nitro group, a carboxylic acid group, an aldehyde group or a sulfonyl halide group).

V is preferably halogen or hydroxyl group. Examples of the halogen are fluorine atom, chlorine atom, bromine atom and iodine atom. The two V's may be the same or different.

The monomer represented by the formula (7) may be used each alone or may be used as a suitable bifunctional comonomer. The comonomer is not particularly limited, and examples thereof are bissulfonyl chloride compound such as 1,4-benzenedisulfonyl chloride, 1,3-benzenedisulfonyl chloride, 1,2-benzenedisulfonyl chloride, 4,4'-biphenyldisulfonyl chloride and naphthalenedisulfonyl chloride; diol compounds such as hydroquinone, resorcinol, catechol, 1,2-dihydroxynaphthalene, 1,4-dihydroxynaphthalene, 1,5-dihydroxynaphthalene, 2,6-dihydroxynaphthalene, 2,7-dihydroxynaphthalene, 4,4'-dihydroxybiphenyl, 2,4'-dihydroxybiphenyl, 2,2'-dihydroxybiphenyl, 4,4'-dihydroxydiphenylmethane, 1,1-bis(4-hydroxyphenyl)ethane, 1,1-bis(4-hydroxyphenyl)cyclohexane, 2,2-bis(4-hydroxyphenyl)propane, 2,2-bis(4-hydroxyphenyl)butane, 1,1-bis(4-hydroxyphenyl)cyclohexane, 2,2-bis(4-hydroxyphenyl)-1,1,1,3,3,3-hexafluoropropane, 1,1-bis(4-hydroxyphenyl)-1-phenylethane, bis(4-hydroxyphenyl)diphenylmethane, 9,9-bis(4-hydroxyphenyl)fluorene, α,α'-bis(4-hydroxyphenyl)-1,4-diisopropylbenzene, 4,4'-dihydroxydiphenyl ether, 2,2'-dihydroxydiphenyl ether, bis(4-hydroxyphenyl) sulfide, bis(2-hydroxyphenyl) sulfide, 1,2-bis(4-hydroxyphenyl)ethane, 1,2-bis(4-hydroxyphenoxy)ethane, 1,2-bis(3-hydroxyphenoxy)ethane, 1,2-bis(4-hydroxyphenoxy)propane, 1,3-bis(4-hydroxyphenoxy)propane, 1,4-bis(4-hydroxyphenoxy)butane, 1,6-bis(4-hydroxyphenoxy)hexane, and diethylene glycol bis(4-hydroxyphenyl) ether; dihalogen compounds such as 4,4'-difluorobenzophenone, 4,4'-dichlorobenzophenone, 2,4-difluorobenzophenone, 4,4'-dibromobenzophenone, 4,4'-difluorodiphenylsulfone, 4,4'-dichlorodiphenylsulfone, 4,4'-dibromodiphenylsulfone, 2,6-difluorobenzonitrile, 2,6-dichlorobenzonitrile, hexafluorobenzene, decafluorobiphenyl, and octafluoronaphthalene, etc. These monomers have a super strong acid group in the side chain. The monomer may have further substituents, and, furthermore, a part or all of hydrogen atoms of the monomers may be substituted with fluorine atoms. These monomers may be mixtures of two or more.

The (co)polymerization reaction of monomers having super strong acid groups can be performed in molten state without using solvents, but is preferably carried out in a suitable solvent. As the solvent, there may be used, for example, aromatic hydrocarbon solvents, ether solvents, ketone solvents, amide solvents, sulfone solvents, sulfoxide solvents, etc. Among them, dimethyl sulfoxide, sulfolane, N,N-dimethylformamide, N,N-dimethylacetamide, N-methylpyrrolidone, N,N'-dimethylimidazolidinone, etc. are preferred because these are high in dissolvability.

The reaction temperature is preferably 20° C.-250° C., more preferably 50° C.-200° C.

Furthermore, the aromatic polymer of the present invention can also be produced by polymerizing a monomer having group D' in the side chain which can be converted to a super strong acid group D and then converting D' to D.

Examples of the monomer having a group in the side chain which can be converted to a super strong acid group are compounds represented by the following formula (8).

V-A'''-V (8)

(in the above formula, A''' represents a divalent group selected from the following formulas (8a)-(8d) and V has the same meanings as defined above).

(8a)

(8b)

(8c)

-continued (8d)

(in the above formulas, D', R, Y, Z", h, h', h", h''', p', r', r'', s', s'', t', t''; q, q' and j have the same meanings as defined above).

The monomers represented by the formula (8) may be used each alone or may be used as suitable bifunctional comonomers. As the comonomers, mention may be made of the same comonomers of the formula (7) except the super strong acid group D. These monomers have a group capable of being converted to a super strong acid group, D'. The (co)polymerization reaction of monomers having a group capable of being converted to a super strong acid group can be performed in molten state without using solvents, but is preferably carried out in a suitable solvent. As the solvent, mention may be made of the same solvents as usable in polymerization of the monomers of the formula (7). The reaction temperature can be the same as that employed for polymerization of the monomers of the formula (7). As the method for converting D' to D, there may be used the same method as mentioned above.

The aromatic polymer of the present invention is characterized by having a super strong acid group in the side chain as mentioned above, and shows excellent characteristics as polymer electrolyte used for membranes of electrochemical devices such as fuel cells.

In the case of using it as such membranes, it is generally used in the form of a film. The method for making the aromatic polymer of the present invention to a film is not particularly limited, and is preferably a method of film formation from solution (solution casting method).

Specifically, the film is produced by dissolving the polymer in a suitable solvent, casting the solution on a glass plate, and removing the solvent. The solvents used for the production of film are not particularly limited as long as they can dissolve the polymer and can be removed later. Suitable examples of the solvents are non-aprotic polar solvents such as N,N-dimethylformamide, N,N-dimethylacetamide, N-methyl-2-pyrrolidone and dimethyl sulfoxide; chlorinated solvents such as dichloromethane, chloroform, 1,2-dichloroethane, chlorobenzene and dichlorobenzene; alcohol solvents such as methanol, ethanol and propanol; and alkylene glycol monoalkyl ethers such as ethylene glycol monomethyl ether, ethylene glycol monoethyl ether, propylene glycol monomethyl ether and propylene glycol monoethyl ether. These may be used each alone and, if necessary, as mixtures of two or more. Of these solvents, preferred are dimethyl sulfoxide, N,N-dimethylformamide, N,N-dimethylacetamide, N-methylpyrrolidone, etc. because these are high in dissolvability for polymers.

Thickness of the film has no special limitation, and is preferably 10-300 µm. If the thickness of the film is thinner than 10 µm, practical strength is sometimes insufficient, and if it is thicker than 300 µm, membrane resistance increases to cause deterioration in characteristics of the electrochemical devices. The film thickness can be controlled by the concentration of solution and the thickness of coat on the substrate.

For the purpose of improving various physical properties of the film, plasticizers, stabilizers, releasing agents, etc. which are used for general polymers can be added to the polymer electrolyte of the present invention. Moreover, other polymers can be alloyed with the polymer of the present invention by a method of mixing and co-casting in the same solvent, and other methods.

Furthermore, for the purpose of improving ionic conductivity, etc., there may be applied known methods such as a method of adding low-molecular electrolytes, acid compounds or other ion conductive polymers and a method of impregnating with solvents. The low-molecular compounds which can be used in the present invention are not particularly limited, and phosphoric acid derivatives represented by the following formula (9) are preferred from the viewpoint of improvement of ionic conductivity.

$$O=P(R'O)_k(OH)_{3-k} \qquad (9)$$

(in the formula, R' represents an alkyl group of 1-6 carbon atoms or an aryl group of 6-12 carbon atoms, k represents 0-2 and when k is 2, the two R' may be the same or different).

In the above formula, k is preferably 0 or 1, more preferably 0. When k is 1 or 2, R' is preferably an alkyl group.

Examples of the alkyl groups are linear or branched alkyl groups or cyclic alkyl groups such as methyl, ethyl, propyl, isopropyl, n-butyl, isobutyl, sec-butyl, pentyl, cyclopentyl, hexyl, and cyclohexyl. Alkyl groups of 1-3 carbon atoms such as methyl, ethyl, propyl and isopropyl are preferred from the viewpoint of proton conductivity. The alkyl groups may have one or more substituents such as halogen atoms, amino groups and hydroxyl groups.

Examples of the aryl groups are phenyl group; alkyl-substituted phenyl groups such as tolyl, ethylphenyl and isopropylphenyl; halogen-substituted phenyl groups such as bromophenyl; naphthyl group, anthryl group, phenanthryl group, nitrophenyl group, chlorophenyl group, etc.

As phosphoric esters in which R' is an alkyl group and k is 1, there are, for example, monomethyl phosphate, monoethyl phosphate, mono-n-propyl phosphate, monoisopropyl phosphate, mono-n-butyl phosphate, monoisobutyl phosphate, mono-sec-butyl phosphate, mono-tert-butyl phosphate, mono-n-pentyl phosphate, mono(1-methylbutyl) phosphate, mono(2-methylbutyl) phosphate, mono(3-methylbutyl) phosphate, mono(1,1-dimethylpropyl) phosphate, mono(2,2-dimethylpropyl) phosphate, mono(1,2-dimethylpropyl) phosphate, mono-n-hexyl phosphate, mono(2-methylpentyl) phosphate, mono(3-methylpentyl) phosphate, etc.

As phosphoric esters in which R' is an alkyl group and k is 2, there are, for example, dimethyl phosphate, diethyl phosphate, di-n-propyl phosphate, diisopropyl phosphate, di-n-butyl phosphate, diisobutyl phosphate, di-sec-butyl phosphate, di-tert-butyl phosphate, di-n-pentyl phosphate, di(1-methylbutyl) phosphate, di(2-methylbutyl) phosphate, di(3-methylbutyl) phosphate, di(1,1-dimethylpropyl) phosphate, di(2,2-dimethylpropyl) phosphate, di(1,2-dimethylpropyl) phosphate, di-n-hexyl phosphate, di(2-methylpentyl) phosphate, di(3-methylpentyl) phosphate, etc.

Of these phosphoric esters of k being 1 or 2, from the viewpoint of proton conductivity, preferred are monomethyl phosphate, monoethyl phosphate, mono-n-propyl phosphate, monoisopropyl phosphate, dimethyl phosphate, diethyl phosphate, di-n-propyl phosphate, diisopropyl phosphate, and mixtures thereof, more preferred are monoethyl phosphate, mono-n-propyl phosphate, monoisopropyl phosphate, diethyl phosphate, di-n-propyl phosphate, diisopropyl phosphate, and mixtures thereof, and most preferred are monoisopropyl phosphate, diisopropyl phosphate and mixtures thereof.

As phosphoric esters in which R' is an aryl group and k is 1, there are, for example, monophenyl phosphate, monotolyl phosphate, monoethylphenyl phosphate, monoisopropylphenyl phosphate, mononaphthyl phosphate, monoanthryl phosphate, monophenanthryl phosphate, mononitrophenyl phosphate, monochlorophenyl phosphate, monobromophenyl phosphate, etc.

As phosphoric esters in which R' is an aryl group and k is 2, there are, for example, diphenyl phosphate, ditolyl phosphate, di(ethylphenyl) phosphate, di(isopropylphenyl) phosphate, dinaphthyl phosphate, dianthryl phosphate, diphenanthryl phosphate, di(nitrophenyl) phosphate, di(chlorophenyl) phosphate, di(bromophenyl) phosphate, etc.

When k is 0, the formula (9) represents orthophosphoric acid.

In the case of adding the phosphoric acid derivatives, the amount thereof is not particularly limited, and, for example, can be used in such an amount as (weight (g) of the phosphoric acid)/(weight (g) of the polymer)=0.001 (g/g)–10 (g/g), preferably 0.01-5 (g/g), especially preferably 0.05-2 (g/g).

If the amount of the phosphoric acid derivatives is too small, sometimes they cannot sufficiently contribute to improvement of proton conductivity. If it is too large, strength of the film decreases and sometimes it becomes difficult to use the film as proton conductive membrane for fuel cells.

The method for allowing the phosphoric acid derivatives to be contained includes, for example, (1) a method of adding the phosphoric acid derivatives to a solution of polymer electrolyte and (2) a method of immersing the film of the polymer electrolyte produced by the above-mentioned method in a solution of the phosphoric acid derivatives.

Moreover, it is known to add inorganic or organic fine particles as a water retaining agent in the case of using for fuel cells in addition to the above-mentioned additives, and these can be used as long as they do not hinder the attainment of the object of the present invention.

Furthermore, for the purpose of improving mechanical strength of the film, it is known to carry out crosslinking by irradiation with electron rays or radiation, and this method can also be used as long as the attainment of the object is not hindered.

When the aromatic polymer of the present invention is subjected to monoaxial or biaxial drawing or rolling, there can be provided drawn membranes or rolled membranes having further excellent characteristics as proton conductive membranes for fuel cells, etc. The membranes obtained by the method of carrying out the rolling while carrying out the drawing are also called rolled membranes here.

The aromatic polymer of the present invention may be directly drawn or rolled to make the drawn membranes or rolled membranes, but usually there is employed a method of monoaxially or biaxially drawing and/or rolling an uncrosslinked membrane preliminarily formed in the form of film by the above-mentioned solvent casting method.

Thickness of the film in this case is not particularly limited, and is preferably 10-500 μm. If the thickness is thinner than 10 μm, damages such as rupture of the film during the drawing are apt to occur. If the thickness is thicker than 500 μm, the drawing is difficult, and further the thickness of the film after drawing becomes too thick, which causes increase of membrane resistance, resulting in unsatisfarctory characteristics of electrochemical devices. The thickness can be controlled by the concentration of the solution and the thickness of the coat on the substrate.

Drawing or rolling ratio is usually 1.05-3.00 times, preferably 1.10-2.50 times in the drawing or rolling direction. If the drawing and/or rolling ratio is less than 1.05 time, the improvement of proton conductivity of the resulting membrane is small, and if it exceeds 3.00 times, the possibility of causing damages such as rupture of membrane increases.

The drawing and rolling temperature is not particularly limited, and is usually about 0° C.-300° C., preferably about 5° C.-200° C., more preferably about 10° C.-100° C.

In carrying out the drawing and rolling of the aromatic polymer of the present invention, it becomes possible to make easier the drawing and rolling when the aromatic polymer contains 5-100% by weight of a solvent. If content of the solvent is less than 5% by weight, it is difficult to perform the drawing and/or the rolling, and if it is more than 100% by weight, the resulting membrane becomes brittle. Use of the aromatic polymer containing 7-70% by weight is preferred because the drawing and rolling is easier, and, furthermore, strength of the membrane increases.

As the solvent, preferred are water, hydrocarbon solvents, alcohol solvents, ether solvents, amide solvents, sulfoxide solvents, ketone solvents, halogenated hydrocarbon solvents, mixed solvents thereof, etc. More preferred are water, toluene, xylene, methanol, ethanol, isopropanol, tetrahydrofuran, N,N-dimethylformamide, N,N-dimethylacetamide, dimethyl sulfoxide, acetone, methylene chloride, methylene chloride/methanol mixed solvent, tetrahydrofuran/methanol mixed solvent, N,N-dimethylacetamide/water mixed solvent, etc.

For the purpose of improving mechanical strength of the film, the thus obtained drawn membrane and rolled membrane can be crosslinked by irradiation with electron rays and radiation as long as attainment of the object of the present invention is not hindered.

Next, the fuel cell of the present invention will be explained.

The fuel cell of the present invention can be produced by bonding a catalyst and a conductive material as a current collector onto both sides of a polymer electrolyte film.

The catalyst is not particularly limited as long as it can activate the redox reaction with hydrogen or oxygen, and known catalysts can be used. It is preferred to use platinum fine particles. The platinum fine particles are preferably supported on particulate or fibrous carbon such as active carbon or graphite.

As for the electroconductive materials as current collectors, known materials can also be used, and porous carbon nonwoven fabrics or carbon papers are preferred because they efficiently transport the raw gas to the catalyst.

As a method for bonding platinum fine particles or platinum fine particles supported on carbon onto the porous carbon nonwoven fabrics or carbon papers and a method for bonding thereto the polymer electrolyte film, there can be employed known methods, for examples, the method disclosed in "J. Electrochem. Soc.: Electrochemical Science and Technology", 135 (9), 2209 (1988).

EXAMPLES

Having thus generally described the present invention, the following specific examples are provided to illustrate the invention. The examples are not intended to limit the scope of the invention in any way.

The proton conductivity was measured by alternating current impedance method under the conditions of temperature: 80° C. and humidity: 90% RH.

Reference Example 1

(A) Copolymerization of 2-methoxy-1,4-dihydroxybenzene and 4,4'-difluorodiphenylsulfone:

In a flask, the inner atmosphere of which was replaced with nitrogen, were charged 100 ml of N-methylpyrrolidone and 10.12 g (73.1 mmols) of 2-methoxy-1,4-dihydroxybenzene, and 10.32 g (74.7 mmols) of potassium carbonate was added thereto, followed by carrying out the reaction at 80° C. for 1 hour. Thereafter, 30 ml of toluene was added and the temperature was gradually raised to 150° C. to distill off toluene. The temperature was lowered to room temperature, and then 18.43 g (72.5 mmols) of 4,4'-difluorodiphenylsulfone was added, followed by heating to 140° C. and carrying out the reaction for 24 hours. After completion of the reaction, the reaction mixture was added to 1000 ml of methanol to precipitate a polymer, followed by filtration to obtain a polymer. Furthermore, purification was carried out by Soxhlet extraction (methanol solvent) to obtain a copolymer (a) of 2-methoxy-1,4-dihydroxybenzene and 4,4'-difluorodiphenylsulfone.

Reference Example 2

(B) Demethylation of the Polymer (a):

21.55 Grams of the polymer (a) produced in Reference Example 1 and 1000 ml of methylene chloride were charged in a flask and the resulting solution was cooled to −78° C., followed by adding dropwise 200 ml of 1M methylene chloride solution of boron tribromide (200 mmols) over a period of 3 hours and 40 minutes. Then, the temperature was gradually raised to room temperature, followed by stirring for 18 hours. After completion of the reaction, the solution was added to 1000 ml of ice water to precipitate a polymer, followed by filtration to obtain a polymer. Furthermore, the polymer was purified by washing with water and reprecipitation, and dried under reduced pressure to obtain 20.36 g of demethylated product (polymer (b)) of the polymer (a). As a result of $^1$H-NMR analysis, it was confirmed that the demethylation reaction quantitatively proceeded. As a result of measurement of the molecular weight by GPC using DMAc as a developing solvent, the number-average molecular weight of the polymer (b) was 25,000 in terms of polystyrene.

Reference Example 3

(C) Preparation of Potassium Pentafluorobenzenesulfonate:

25 Grams (93.8 mmols) of pentafluorobenzenesulfonyl fluoride was charged in a flask, and 13.0 g (93.8 mmols) of potassium carbonate and 100 ml of water were added under cooling with ice, followed by stirring at room temperature for 9 hours. Then, 1.3 g (9.4 mmols) of potassium carbonate was further added and the mixture was stirred at 60° C. for 1 hour. A white solid produced was filtered off and purified by recrystallization with water. The resulting white solid was subjected to $^{19}$F-NMR measurement and it was confirmed that the resulting white solid was potassium pentafluorobenzenesulfonate (c).

Example 1

(D) Reaction of the Polymer (b) with Potassium Pentafluorobenzenesulfonate (c):

2.1 Grams of the polymer (b) produced in (B) and 50 ml of DMAc were charged in a flask, the inner atmosphere of which was replaced with nitrogen, and then 512 mg (3.70 mmols) of potassium carbonate was charged therein, followed by heating to 130° C. while stirring. Then, 50 ml of toluene was added and the temperature was raised to 150° C. to distill off toluene. Thereafter, the temperature of the flask was lowered to 60° C., and 100 ml of a DMAc solution of 7.09 g (24.8 mmols) of (c) produced in Reference Example 3 was added dropwise over a period of 40 minutes. Then, reaction was carried out at 70° C. for 100 minutes and at 60° C. for 20 hours. After completion of the reaction, the solution was poured into 1N hydrochloric acid and the precipitated polymer was filtered off and purified by reprecipitation and washing with water. The polymer was redissolved in DMAc, the insoluble matter was filtered off, and then the solution was spread on a petri dish and a film was formed by casting at 80° C. to obtain a tough membrane (d) of 56 μm in thickness. Results of measurement of ion exchange capacity and proton conductivity of (d) are shown in Table 1.

Reference Example 4

(E) Bromination Reaction of Poly(Oxy-4,4'-biphenyleneoxy-4,4'-diphenylsulfone):

40 Grams of commercially available poly(oxy-4,4'-biphenyleneoxy-4,4'-diphenylsulfone) and 500 ml of methylene chloride were charged in a flask, and thereto was added 37.4 g (210 mmols) of N-bromosuccinimide, followed by keeping the flask at 0° C. and adding dropwise 65.4 g of concentrated sulfuric acid while stirring over a period of 30 minutes. After stirring at room temperature for 4 hours, the reaction mixture was poured into ice water and 7.56 g (60 mmols) of $Na_2SO_3$ was added. Then, aqueous NaOH solution was added thereto until the pH of the system reached 10, and methylene chloride was distilled off under reduced pressure, followed by filtration and drying to obtain 63.1 g of a polymer (e). Elemental analysis, $^1$H-NMR and $^{13}$C-NMR measurements were carried out to find that a bromo group was introduced into the phenyl ring of the resulting polymer (e). The bromo group introduced into the polymer (e) was in an amount of 27% by weight. As a result of measurement of the molecular weight by GPC using DMAc as a developing solvent, the number-average molecular weight of the polymer (e) was 34,000 in terms of polystyrene.

Reference Example 5

(F) Preparation of Potassium 5-iodooctafluoro-3-oxapentanesulfonate:

15.01 Grams of 5-iodooctafluoropentyl-3-oxapentanesulfonyl fluoride, 5 ml of water, 5 ml of methylene chloride, 4.80 g of 2,6-lutidine and 0.1 ml of a 1M THF solution of tetra-n-butylammonium fluoride were charged in a flask, and the reaction was carried out at room temperature for 4 days. The reaction mixture was subjected to extraction with methylene chloride three times, and the solvent was distilled off under reduced pressure. Then, 30 ml of THF and 2.82 g of potassium carbonate were added, followed by stirring at room temperature for 10 hours. The solid was filtered off and the filtrate was concentrated to precipitate a white solid. The white solid was recrystallized with a THF/toluene mixed solvent to obtain 12.3 g of a white solid. The resulting white solid was subjected to $^{19}$F-NMR and elemental analysis, and it was confirmed that the white solid was potassium 5-iodooctafluoro-3-oxapentanesulfonate (f).

Example 2

(G) Reaction of the Polymer (e) with (f):

2 Grams of the polymer (e) produced in Reference Example 4, 1.97 g (31.0 mmols) of copper powder and 10 ml of N,N-dimethyl sulfoxide were charged in a flask, the inner atmosphere of which was replaced with nitrogen, followed by stirring at 120° C. for 2 hours. Then, while keeping the flask at 120° C., a solution of 4 g (8.66 mmols) of the (f) prepared in Reference Example 5 in 10 ml of N,N-dimethyl sulfoxide was added. After carrying out the reaction at 120° C. for 6 hours, the reaction product was added to 100 ml of 1N aqueous HCl solution to precipitate a polymer. After the polymer was filtered off, it was redissolved in N,N-dimethylacetamide, and the insoluble matter was filtered off. Then, the solution was spread on a petri dish and a film was formed by casting at 80° C. to obtain a tough membrane (g) of 35 μm in thickness. As a result of measurement of the molecular weight by GPC using DMAc as a developing solvent, the number-average molecular weight was 140,000 in terms of polystyrene. A temperature at which the weight of the polymer began to reduce with heating was measured by a differential thermal analysis instrument to obtain 323° C., which showed very high heat resistance. Results of measurement of ion exchange capacity and proton conductivity of (g) are shown in Table 1.

Example 3

The procedure of Example 2 was repeated, except that 0.5 g of (e), 0.5 g of copper powder and 1 g of (f) were used and after (f) was added, the reaction was carried out at 120° C. for 40 hours, and as a result of the procedure, a tough membrane (h) of 40 μm in thickness was obtained. As a result of measurement of the molecular weight by GPC using DMAc as a developing solvent, the number-average molecular weight was 92,000 in terms of polystyrene. Results of measurement of ion exchange capacity and proton conductivity of (h) are shown in Table 1.

Example 4

The procedure of Example 2 was repeated, except that 2 g of (e), 0.8 g of copper powder and 2.15 g of (f) were used and after (f) was added, the reaction was carried out at 120° C. for 20 hours, and a tough membrane (i) of 30 μm in thickness was obtained. As a result of measurement of the molecular weight by GPC using DMAc as a developing solvent, the number-average molecular weight was 63,000 in terms of polystyrene. Results of measurement of ion exchange capacity and proton conductivity of (i) are shown in Table 1.

Example 5

The membrane (water content: 20 wt %) obtained in Example 4 was drawn to 1.5 times in planar direction monoaxial direction, thereby obtaining a drawn membrane (j). The proton conductivity was measured and the result is shown in Table 1.

Example 6

The membrane (water content: 20 wt %) obtained in Example 4 was drawn to 2 times in planar direction ⌡monoaxial direction, thereby obtaining a drawn membrane (k). The proton conductivity was measured and the result is shown in Table 1.

Comparative Example 1

(I) Preparation of Sulfonated Polyether Ether Ketone:

25 Grams of commercially available polyether ether ketone and 125 ml of concentrated sulfuric acid were charged in a flask and stirred at room temperature for 48 hours under nitrogen atmosphere to sulfonate the polymer. The reaction mixture was slowly added dropwise to 3 liters of deionized water to precipitate sulfonated polyether ether ketone, which was recovered by filtration. The precipitate was repeatedly subjected to washing with deionized water using a mixer and recovery operation by a suction filter until the wash liquid became neutral, followed by drying to obtain a polymer. The resulting polymer was redissolved in DMAc, and the insoluble matter was filtered off. Then, the solution was spread on a petri dish and a film was formed by casting at 80° C. to obtain a tough membrane (1) of 30 μm in thickness. Results of measurement of ion exchange capacity and proton conductivity of (1) are shown in Table 1.

Comparative Example 2

(J) Preparation of Sulfonated Polyether Sulfone (i)

In a flask, the inner atmosphere of which was replaced with nitrogen were charged 13.5 g (47.0 mmols) of 4,4'-dichlorodiphenylsulfon, 7.29 g (29.1 mmols) of 4,4'-dihydroxydiphenylsulfon, 1.66 g (8.92 mmols) of 4,4'-biphenol, 0.984 g (8.93 mmols) of resorcinol, and 7.14 g (5.17 mmols) of potassium carbonate and dissolved with 40 ml of NMP. Thereafter, 20 ml of toluene was added followed by heating to 190° C. and carrying out the reaction for 14 hours while distilling off toluene. During the reaction, increase of the viscosity of the solution was observed. After completion of the reaction, the polymerized solution was poured into methanol to precipitate a polymer, followed by filtration and drying. Thus obtained polymer was charged in a flask, 120 ml of concentrated sulfuric acid were further charged in the flask and stirred at room temperature for 48 hours under nitrogen atmosphere to sulfonate the polymer. The reaction solution was slowly added dropwise to 3 liters of deionized water to precipitate sulfonated polymer. The precipitate was repeatedly subjected to washing with deionized water using a mixer and recovery operation by a suction filter until the wash liquid became neutral, followed by drying to obtain a polymer. The resulting polymer was redissolved in DMAc, and the insoluble matter was filtered off. Then, the solution was spread on a petri dish and a film was formed by casting at 80° C. to obtain a tough membrane (q) of 37 μm in thickness. Results of measurement of ion exchange capacity and proton conductivity of (q) are shown in Table 1.

Comparative Example 3

(K) Preparation of Sulfonated Polyether Ether Sulfone(ii)

The polymerization, sulfonation and casting procedure of Comparative Example 2 was repeated except that 13.4 g (46.6 mmols) of 4,4'-dichlorodiphenylsulfon, 7.64 g (30.5 mmols) of 4,4'-dihydroxydiphenylsulfon, 1.50 g (8.04 mmols) of 4,4'-biphenol, 0.886 g (8.04 mmols) of resorcinol and 7.08 g (5.12 mmols) of potassium carbonate were used. A tough membrane (r) of 31 μm in thickness was obtained. Results of measurement of ion exchange capacity and proton conductivity of (r) are shown in Table 1.

TABLE 1

|  | Proton conductivity (S/cm) | Ion exchange capacity (meq/g) |
| --- | --- | --- |
| Example 1 | $4.4 \times 10^{-2}$ | 1.4 |
| Example 2 | $1.0 \times 10^{-1}$ | 1.6 |
| Example 3 | $8.9 \times 10^{-2}$ | 1.5 |
| Example 4 | $4.9 \times 10^{-2}$ | 1.2 |
| Example 5 | $6.6 \times 10^{-2}$ | 1.2 |
| Example 6 | $6.8 \times 10^{-2}$ | 1.2 |
| Comparative Example 1 | $4.4 \times 10^{-2}$ | 1.8 |
| Comparative Example 2 | $2.6 \times 10^{-2}$ | 1.4 |
| Comparative Example 3 | $1.0 \times 10^{-2}$ | 1.1 |

Figure 1:
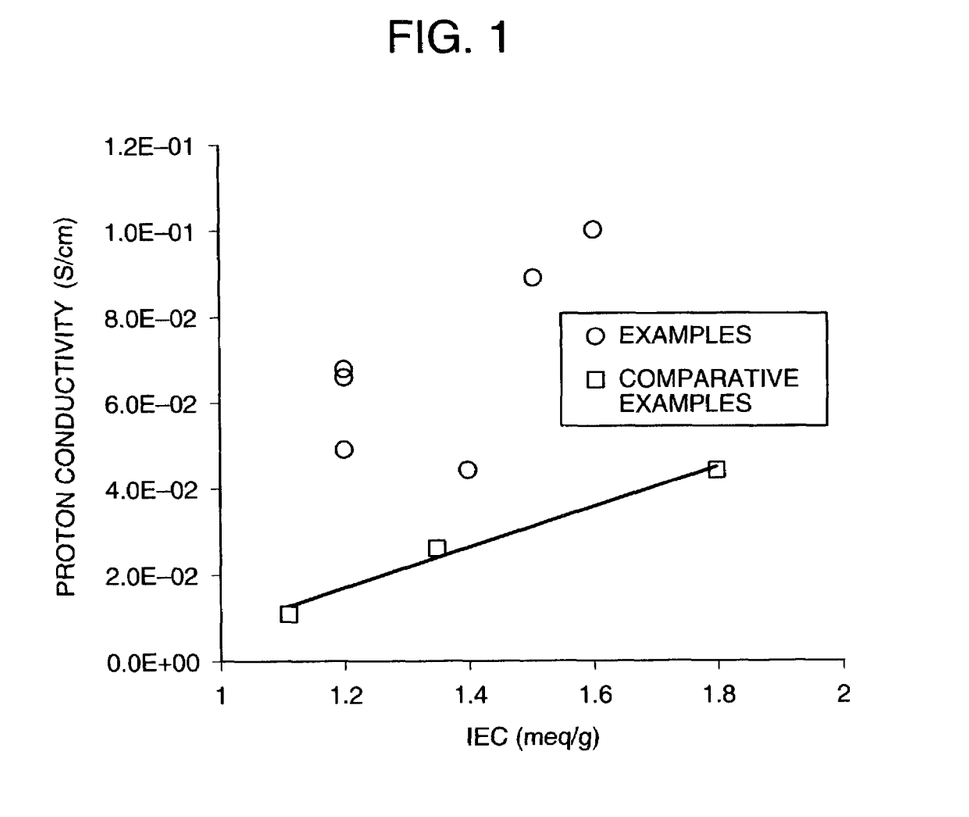
FIG. 1 is a graph showing the ion exchange capacity (IEC) and proton conductivity of Examples and Comparative Examples.

The ion exchange capacity (IEC) and proton conductivity of Examples and Comparative Examples are shown in FIG. 1.

According to the present invention, there can be provided an aromatic polymer which is characterized by having a super strong acid group in a side chain. The aromatic polymer of the present invention shows excellent characteristics as proton conductive membrane of fuel cells and the like.

What is claimed is:

1. An aromatic polymer comprising an aromatic ring in a main chain and a super strong acid group in a side chain.

2. The aromatic polymer according to claim 1 which is represented by the following formula (1):

$$-(A-Z)_m-(A'-Z')_n- \quad (1)$$

(in the above formula, A represents a divalent aromatic group, A' represents a divalent aromatic group comprising a super strong acid group as a substituent, Z and Z' independently of one another represent a direct bond or a divalent group, m and n represent the number of repeating units, n is in the range of 10-100,000 and the repeating units present in the number of n may be the same or different, and m is in the range of 0-100,000 and the repeating units present in the number of m may be the same or different).

3. The aromatic polymer according to claim 1 or 2, wherein A represents a divalent aromatic group selected from the group consisting of the following formulas (3a)-(3c), and A' represents a divalent aromatic group selected from the group consisting of the formulas (3 d)-(3 g):

(3a)

(3b)

(3c)

(3d)

(3e)

(3f)

(3g)

(in the formulas, R represents a hydroxyl group, an alkyl group of 1-6 carbon atoms, an alkoxy group of 1-6 carbon atoms, an aralkyl group of 7-12 carbon atoms, an aryl group, or a halogen atom; p, r, s and t independently of one another represent a number of 0-4; q represents a number of 0-6; when a plurality of R are present, they may be the same or different; j represents a number of 0 or 1; Z'' and Y independently of one another represent a direct bond or a divalent group, when a plurality of Z'' are present, they may be the same or different, and when a plurality of Y are present, they may be the same or different; D represents a super strong acid group and when a plurality of D are present, they may be the same or different; h, h'' and h''' independently of one another represent a number of 1-4; h' represents a number of 1-6; (p'+h), (r'+h'') and (s''+h''') independently of one another represent a number of 1-4; s', t', r'' and t'' independently of one another represent a number of 0-4; and (q'+h') represents a number of 1-6).

4. The aromatic polymer according to claim 3, wherein Z, Z' and Y independently of one another represent a group selected from the group consisting of a direct bond, —O—, —S—, —CO—, —SO$_2$—, an alkylene group of 1-12 carbon atoms and an alkylenedioxy group of 1-12 carbon atoms, and Z'' represents a group selected from the group consisting of a direct bond, —O—, —S—, —CO—, —SO$_2$—, an alkylene group of about 1-12 carbon atoms which may be substituted with fluorine, an alkylenedioxy group of about 1-12 carbon atoms which may be substituted with fluorine, an arylene group of about 6-12 carbon atoms which may be substituted with fluorine, an aryleneoxy group of about 6-12 carbon atoms which may be substituted with fluorine, and an alkyleneoxy group of about 1-12 carbon atoms which may be substituted with fluorine.

5. The aromatic polymer according to claim 1 or 2, wherein the super strong acid group is selected from the group consisting of the groups represented by the following formulas (2a)-(2d):

(2a)

(2b)

(2c)

(2d)

(in the formulas, G represents an alkylene group in which a part or all of hydrogen atoms are substituted with fluorine, an aralkylene group in which a part or all of hydrogen atoms are substituted with fluorine, or an arylene group in which a part or all of hydrogen atoms are substituted with fluorine, $W^+$ represents a cation, E represents an alkyl group in which a part or all of hydrogen atoms are substituted with fluorine, an aralkyl group in which a part or all of hydrogen atoms are substituted with fluorine, or an aryl group in which a part or all of hydrogen atoms are substituted with fluorine).

6. The aromatic polymer according claim 5, wherein $W_+$ is a hydrogen ion.

7. A method for producing an aromatic polymer described in claim 1 or 2 which comprises reacting a polymer represented by the following formula (4) with a compound represented by the following formula (5):

(4)

[in the formula (4), A represents a divalent aromatic group, Z and Z' independently of one another represent a direct bond or a divalent group, m and n represent the number of repeating units, n is in the range of 10-100,000 and the repeating units present in the number of n may be the same or different, m is in the range of 0-100,000 and the repeating units present in the number of m may be the same or different, and A" represents a group selected from the group consisting of the following formulas (4a)-(4d):

(in the formulas, R represents a hydroxyl group, an alkyl group of 1-6 carbon atoms, an alkoxy group of 1-6 carbon atoms, an aralkyl group of 7-12 carbon atoms, an aryl group, or a halogen atom, and when a plurality of R are present, they may be the same or different; j represents a number of 0 or 1; Y independently of one another represent a direct bond or a divalent group, and when a plurality of Y are present, they may be the same or different; h, h" and h'" independently of one another represent a number of 1-4; h' represents a number of 1-6; (p'+h), (r'+h") and (s"+h'") independently of one another represent a number of 1-4; s', t', r" and t" independently of one another represent a number of 0-4; (q'+h') represents a number of 1-6; and Z'" represents a group which reacts with E to form Z", which represents a direct bond or a divalent group, and when a plurality of Z" are present, they may be the same or different)],

E—D  (5)

(in the formula (5), D represents a super strong acid group, and when a plurality of D are present, they may be the same or different, and E represents a group which reacts with Z'" to form Z").

8. A method for producing an aromatic polymer described in claim 1 or 2 which comprises reacting the polymer represented by the following formula (4) with a compound represented by the following formula (6) and then converting D' to D, D representing a super strong acid group, and when a plurality of D are present, they may be the same or different:

(4)

[in the formula (4), A represents a divalent aromatic group, Z and Z' independently of one another represent a direct bond or a divalent group, m and n represent the number of repeating units, n is in the range of 10-100,000 and the repeating units present in the number of n may be the same or different, m is in the range of 0-100,000 and the repeating units present in the number of m may be the same or different, and A" represents a group selected from the group consisting of the following formulas (4a)-(4d):

(in the formulas, R represents a hydroxyl group, an alkyl group of 1-6 carbon atoms, an alkoxy group of 1-6 carbon atoms, an aralkyl group of 7-12 carbon atoms, an aryl group, or a halogen atom, and when a plurality of R are present, they may be the same or different; j represents a number of 0 or 1; Y independently of one another represent a direct bond or a divalent group, and when a plurality of Y are present, they may be the same or different; h, h" and h'" independently of one another represent a number of 1-4; h' represents a number of 1-6; (p'+h), (r'+h") and (s"+h'") independently of one another represent a number of 1-4; s', t', r" and t" independently of one another represent a number of 0-4; (q'+h') represents a number of 1-6; and Z'" represents a group which reacts with E to form Z", which represents a direct bond or a divalent group, and when a plurality of Z" are present, they may be the same or different)],

E—D' (6)

(in the formula, E represents a group which reacts with Z'" to form Z", and D' represents a group capable of being converted to D).

9. A method for producing an aromatic polymer described in claim 1 or 2 which comprises polymerizing a monomer represented by the following formula (7):

V—A'—V (7)

(in the above formula, A' represents a divalent aromatic group comprising a super strong acid group as a substituent, and the two V independently of one another represent halogen, —OH, —NH$_2$—, —SH, —COOH, —CHO, —NO$_2$ or a halogenated sulfonyl group).

10. A method for producing an aromatic polymer described in claim 1 or 2 which comprises polymerizing a monomer represented by the following formula (8) and then converting D' to D (D represents a super strong acid group, and when a plurality of D are present, they may be the same or different):

V—A'''—V (8)

(in the above formula, A''' represents a divalent group selected from the group consisting of the following formulas (8a)(8d) and the two V independently of one another represent halogen, —OH, —NH$_2$—, —SH, —COOH,—CHO, —NO$_2$ or a halogenated sulfonyl group):

(8a)

(8b)

(in the formulas, R represents a hydroxyl group, an alkyl group of 1-6 carbon atoms, an alkoxy group of 1-6 carbon atoms, an aralkyl group of 7-12 carbon atoms, an aryl group, or a halogen atom, and when a plurality of R are present, they may be the same or different; j represents a number of 0 or 1; Z" and Y independently of one another represent a direct bond or a divalent group, when a plurality of Z" are present, they may be the same or different, and when a plurality of Y are present, they may be the same or different; h, h" and h'" independently of one another represent a number of 1-4; h' represents a number of 1-6; (p'+h), (r'+h') and (s"+h'") independently of one another represent a number of 1-4; s', t', r" and t" independently of one another represent a number of 0-4; (q'+h') represents a number of 1-6; and D' represents a group capable of being converted to D).

11. The method according to claim 7, wherein W$^+$ is a hydrogen ion.

12. A polymer electrolyte which comprises an aromatic polymer of claim 1 or 2 as an effective component.

13. A polymer electrolyte membrane comprising the polymer electrolyte of claim 12.

14. A polymer electrolyte membrane, comprising a drawn membrane or a rolled membrane obtained by monoaxially or biaxially drawing or rolling the polymer electrolyte of claim 12.

15. The polymer electrolyte membrane according to claim 14, wherein the drawing or rolling ratio is 1.05-3 times.

16. A fuel cell produced using a polymer electrolyte membrane of claim 13.

17. A polymer electrolyte which comprises an aromatic polymer of claim 3 as an effective component.

18. A polymer electrolyte membrane comprising the polymer electrolyte of claim 17.

19. A fuel cell produced using a polymer electrolyte membrane of claim 18.

* * * * *